United States Patent [19]
Plangetis

[11] Patent Number: 5,885,007
[45] Date of Patent: Mar. 23, 1999

[54] ADJUSTABLE BEARING SYSTEM WITH SELECTIVELY OPTIMIZED INSTALLATIONAL CLEARANCES

[75] Inventor: Gus F. Plangetis, Annapolis, Md.

[73] Assignee: The United States of America as represented by the Secretary of the Navy, Washington, D.C.

[21] Appl. No.: 885,132

[22] Filed: Jun. 30, 1997

[51] Int. Cl.$^6$ .................................................. F16C 23/02
[52] U.S. Cl. ......................................... 384/266; 384/259
[58] Field of Search .................................. 384/263, 266, 384/270, 258, 259

[56] References Cited

U.S. PATENT DOCUMENTS

| | | | |
|---|---|---|---|
| 916,242 | 3/1909 | Winborne | 384/266 |
| 1,952,275 | 3/1934 | Arms | 384/266 |
| 2,133,476 | 10/1938 | Scaife | 384/266 |

*Primary Examiner*—Lenard A. Footland
*Attorney, Agent, or Firm*—John Forrest; Jacob Shuster

[57] ABSTRACT

Angularly spaced sector portions of a bushing element attached by its annular flange to a housing, adjustably positions angularly spaced bearing elements and wedge-shaped spacers for bearing support of a shaft with desired radial and axial clearances maintained by fasteners extending into the housing parallel to the shaft axis from the flanges of the bushing and the bearing elements to accommodate radial adjustment, while fastener studs extending perpendicular to the shaft axis through enlarged holes in all of the elements of the bearing assembly accommodate axial adjustment before attachment of the bearing elements in their adjusted positions to the housing is finalized.

14 Claims, 2 Drawing Sheets

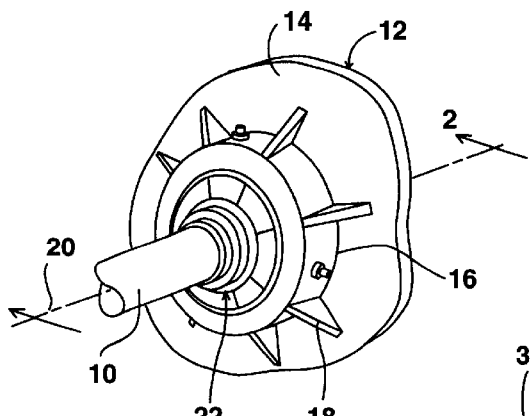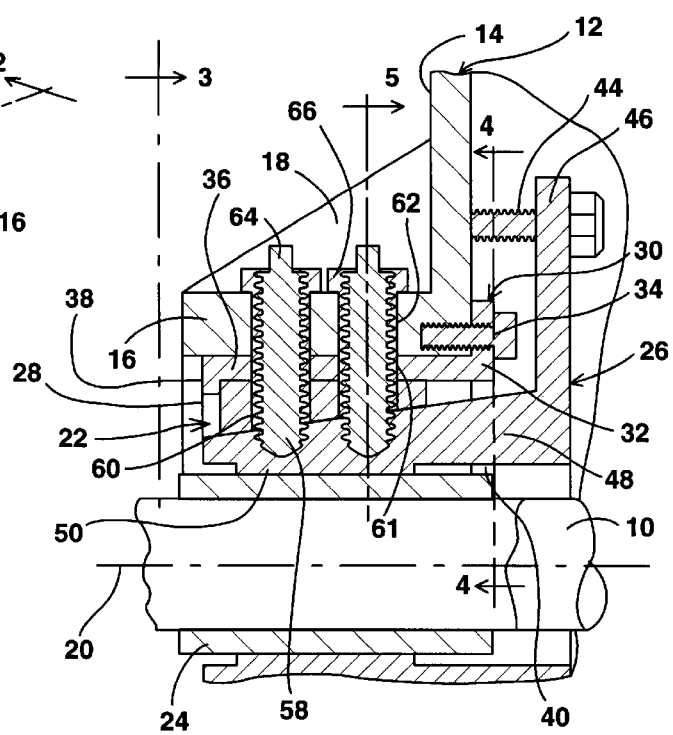
FIG. 1
FIG. 2
FIG. 3
FIG. 8

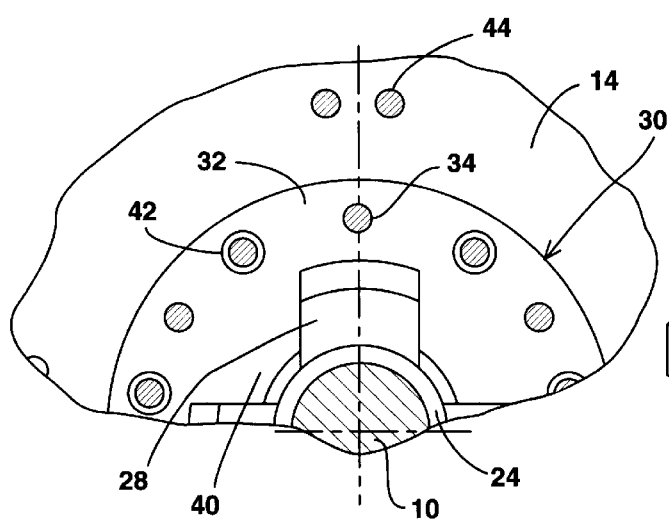
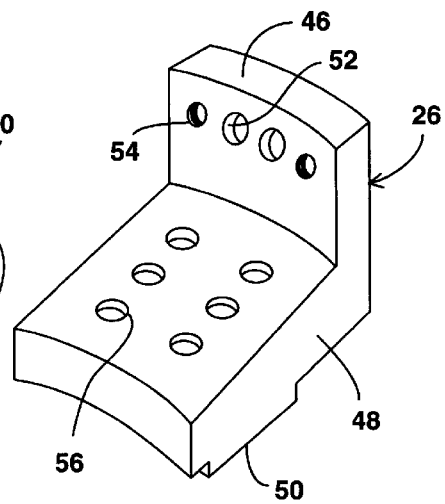
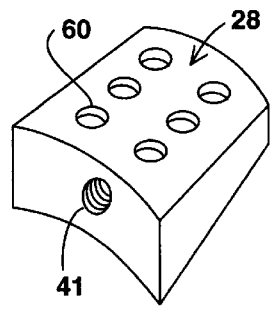
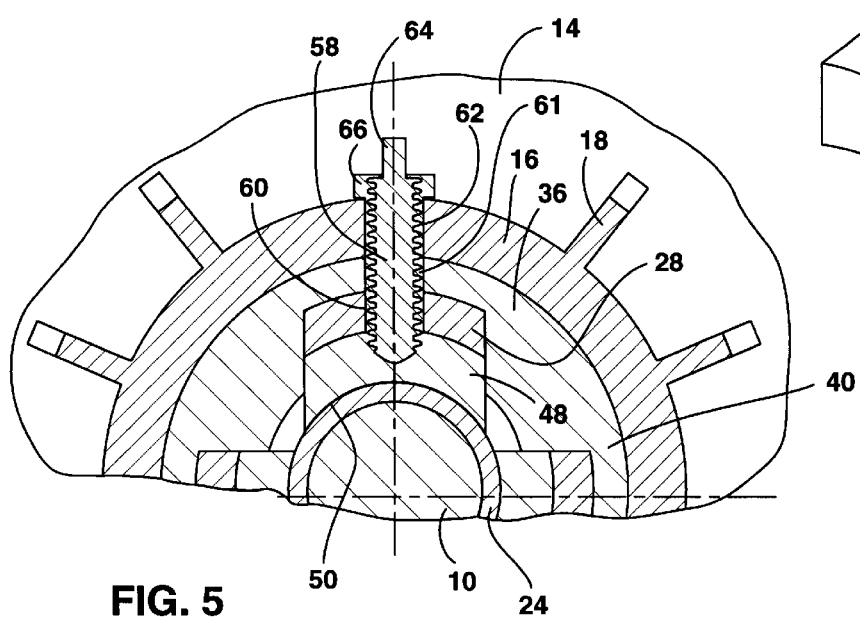
FIG. 4
FIG. 6
FIG. 7
FIG. 5

ADJUSTABLE BEARING SYSTEM WITH SELECTIVELY OPTIMIZED INSTALLATIONAL CLEARANCES

The present invention relates in general to rotational support for a shaft through a bearing system which is selectively adjustable during assembly and installation to meet desired clearance conditions.

BACKGROUND OF THE INVENTION

Cylindrical/spherical bearing systems of conventional types are limited to an extremely small range of clearances within which to accommodate various operational conditions. Thus, a very tight clearance is extremely difficult to achieve for certain installations or conditions such as quiet submarine control surface operation and hydrodynamic film support/operating environments. Also, in view of the foregoing referred to clearance requirements associated with conventional bearing systems, removal and reinstallation of worn bearings, replacement of parts thereof and centering of a bearing shaft within misaligned housing openings presents problems that are very difficult and/or costly to solve.

It is therefore an important object of the present invention to provide a bearing support system for rotational shafts through which clearances between shaft and bearing surfaces may be more readily or realistically optimized for desired operational conditions.

SUMMARY OF THE INVENTION

In accordance with the present invention a shaft is supported by angularly spaced bearing elements that are adjustably positioned relative to the rotational axis of the shaft within a cylindrical housing section through which the shaft extends, in order to achieve selectively desirable radial and axial clearances between radially inner bearing surfaces on the bearing elements and a bearing sleeve fixed to the shaft. Each of the bearing elements includes a flange portion through which screw fasteners extending parallel to the axis of the shaft to accommodate axial adjustment before attachment of the bearing elements to the housing.

Axially tapered portions of the bearing elements on which the radially inner bearing surfaces are formed are angularly aligned with overlying sectors of a bushing element extending axially from an annular mounting flange having screw fasteners extending therefrom parallel to the shaft axis to accommodate radial and angular adjustment of the bushing element before attachment to the housing. The ends of the bushing sectors opposite the mounting flange are provided with retention flanges limiting axial displacement of underlying wedge-shaped spacers positioned between each axially tapered portion of a bearing element and a bushing sector. Threaded studs extend perpendicular to the shaft axis from each tapered portion of the bearing elements through enlarged holes in the spacers, the bushing sectors and the cylindrical housing section before final attachment of the bearing elements to the housing by anchoring nuts threadedly applied to radially projecting ends of the studs on the housing section.

BRIEF DESCRIPTION OF DRAWING FIGURES

A more complete appreciation of the invention and many of its attendant advantages will be readily appreciated as the same becomes better understood by reference to the following detailed description when considered in connection with the accompanying drawing wherein:

FIG. 1 is a perspective view of a shaft bearing installation in accordance with one embodiment of the invention;

FIG. 2 is a partial section view taken substantially through a plane indicated by section line 2—2 in FIG. 1;

FIGS. 3, 4 and 5 are partial section views taken substantially through planes indicated by section lines 3—3, 4—4 and 5—5 in FIG. 2; and FIGS. 6, 7 and 8 are perspective views of bearing, spacer and bushing elements, respectively disassembled from the bearing assembly shown in FIGS. 1–5.

DETAILED DESCRIPTION OF PREFERRED EMBODIMENT

Referring now to the drawing in detail, FIGS. 1 and 2 illustrate a cylindrical operating shaft 10 extending into a housing 12 having a panel portion 14 from which a cylindrical section 16 extends forming an opening in the housing receiving the shaft 10. A plurality of stiffener elements 18 interconnect the section 16 and panel portion 14 of the housing 12 and are angularly spaced from each other about a rotational axis 20 of the shaft 10 supported within the housing section 16 by a bearing assembly generally referred to by reference numeral 22.

As shown in FIG. 2, the bearing assembly 22, which is adjustably secured to the housing 12 as hereinafter described in detail, journals the shaft 10 having a sleeve 24 fixed thereto for bearing contact with four (4) bearing elements 26 of the bearing assembly 22 on which four (4) wedge-shaped spacers 28 are positioned. Each of the bearing elements 26 and spacers 28 as respectively illustrated in FIGS. 6 and 7 disassembled from the bearing assembly 22, are interfitted with a single bushing element 30 shown disassembled in FIG. 8.

Referring now to FIGS. 2, 4 and 8, the bushing element 30 includes an annular mounting flange 32 that is rearwardly attached to the cylindrical section 16 of the housing by screw fasteners 34 extending parallel to the shaft axis 20. A cylindrical portion 36 of the bushing element extends from the mounting flange 32 in contact with the cylindrical surface of the opening formed in the housing section 16 as shown in FIG. 2. Four retention flanges 38 projects radially inwardly from portion 36 of the bushing element 30 between four angularly spaced sectors 40 thereof at the forward end of the bushing element opposite the mounting flange 32 to abut the four spacers 28. The spacers are adjustably positioned in axial directions on the bearing elements 26 by means of threaded tools inserted into threaded holes 41 formed in their radially larger axial ends as shown in FIG. 7. The bearing elements 26 and the wedge-shaped spacers 28 are thereby maintained in angularly spaced relation about the axis 20 of shaft 10 by the bushing sectors 40 which extend axially from the mounting flange 32 of the bushing element 30 and radially inward of the bushing portion 36. The screw fasteners 34 threadedly attached to the housing 12 as shown in FIG. 2, extend through angularly spaced holes in the mounting flange 32 of the bushing element 30, including circular holes 42 and threaded holes 43 as shown in FIG. 4 through which the screw fasteners 34 extend to secure and position the bushing element 30 in the housing 12. The threaded holes 43 in the flange 32 receive jacking type screws 34 to allow for easy removal and axial positioning in case the bushing element 30 gets misaligned during installation.

Each of the bearing elements 26 is also attached to the housing by two screw fasteners 44 extending parallel to the shaft axis 20 through a flange portion 46 from which an axially tapered portion 48 extends, as shown in FIGS. 2, 4 and 6. The radially inner surface of the tapered portion 48 has a projecting surface section 50 through which bearing contact is made with the shaft sleeve 24. The screw fasteners 44 extend through two enlarged holes 52 located between two threaded holes 54 formed in the flange portion 46 of each bushing element 26, as shown in FIG. 6, for adjusted attachment rearwardly to the panel portion 14 of the housing 12.

Once a proper setting is achieved by axial adjustment during installation of the bearing elements 26 by use of jacking screws extending through the threaded holes 54, such jacking screws are removed. Six threaded recesses 56 are formed in the tapered portion 48 of each bearing element 26, as also shown in FIG. 6, for receiving the threaded ends of screw studs 58 extending perpendicular to the axis 20, as shown in FIGS. 2 and 5, through enlarged holes 60, 61 and 62 respectively formed in the wedge-shaped spacers 28 to accommodate its axial adjustment, in the sector portions 40 of the bushing element 30 and in the housing section 16. The projecting ends 64 of the studs 58 mount anchoring screw heads 66 that are threaded into abutment with the housing section 16 for holding the elements 30, 26, and 28 of the bearing assembly 22 in adjusted positions.

It will become apparent from the foregoing description that before tightening of screw fasteners, the enlarged holes 52 in the flange portion 46 of the bearing elements 26 allow for radial adjustments while the enlarged holes 62, 60 and 61 respectively formed in the housing section 16, wedge-shaped spacers 28, and the sector portions 40 of the bushing element 30 allow for axial adjustments. The tapered portions 48 of the bearing elements 26 allows for a wedging effect as needed to take up clearance with the shaft sleeve 24 during initial bearing installation. The enlarged flange holes 52 aforementioned enable radial clearance reduction as needed before bearing contact is made with the shaft sleeve 24. During final adjustment, the axially orientated holes 60, 61 and 62 receive the studs 58 to which the anchoring nuts 66 are applied for secure fastening of the bearing assembly in its operational condition to the housing 12 after proper clearances have been verified.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a housing having a rotational axis along which an operational shaft axially extends, a bearing assembly supporting said shaft for rotation about said axis, including: a plurality of bearing elements having radially inner bearing surfaces; bushing means mounted on said housing for positioning said bearing elements in angularly spaced relation to each other about said shaft; spacer means axially positioned by the bushing means in engagement with the bearing elements for holding the bearing surfaces in operative relation to the shaft; and adjustable fastener means mounted by the bushing means and the bearing elements for engagement with the housing to establish and maintain radial and axial clearances between the shaft and the bearing surfaces on the bearing elements while being held in said operative relation to the shaft by the bushing means.

2. The bearing assembly as defined in claim 1 wherein said bushing means and the bearing elements include flange portions through which the adjustable fastener means establish the radial clearances.

3. The bearing assembly as defined in claim 2 wherein said adjustable fastener means include studs threadedly connected to the bearing elements and extending therefrom perpendicular to the rotational axis through aligned clearance holes in the spacer means and the bushing means; and means for anchoring the studs to the housing after establishment of the radial and axial clearances between the shaft and the bearing elements.

4. The bearing assembly as defined in claim 3 wherein said flange portion of the bushing means is secured by the adjustable fastener means to the housing and from which angularly spaced sector portions extend in parallel spaced relation to the shaft, each of said sector portions having a retention flange limiting axial adjustment of the spacer means thereon.

5. The bearing assembly as defined in claim 4 wherein said spacer means comprises a plurality of wedge-shaped elements respectively positioned on the sector portions of the bushing means in engagement with said retention flanges.

6. The combination as defined in claim 5 wherein the housing includes a cylindrical section extending axially therefrom along said rotational axis, within which the bearing assembly is disposed, the means for anchoring comprising nuts threadedly engaged with the studs in abutment with the cylindrical section of the housing.

7. The bearing assembly as defined in claim 4 wherein said spacer means comprises a plurality of wedge-shaped elements respectively positioned on the sector portions of the bushing means in engagement with said retention flanges.

8. The bearing assembly as defined in claim 2 wherein said flange portion of the bushing means is secured by the adjustable fastener means to the housing and from which angularly spaced sector portions extend in parallel spaced relation to the shaft, each of said sector portions having a retention flange limiting axial adjustment of the spacer means thereon.

9. The bearing assembly as defined in claim 1 wherein said adjustable fastener includes studs threadedly connected to the bearing elements and extending therefrom perpendicular to the rotational axis through aligned clearance holes in the spacer means and the bushing means; and means for anchoring the studs to the housing after establishment of the radial and axial clearances between the shaft and the bearing elements.

10. The combination as defined in claim 9 wherein the housing includes a cylindrical section extending axially therefrom along said rotational axis, within which the bearing assembly is disposed, the means for anchoring comprising nuts threadedly engaged with the studs in abutment with the cylindrical section of the housing.

11. In combination with a housing through which a rotational axis is established for operational support of a shaft rotatable about said axis, a bearing assembly comprising: a plurality of angularly spaced bearing elements; an annular bushing element having means for adjustably positioning the bearing elements in operative relation to said rotational axis; and fastener means extending from the bearing and bushing elements into the housing parallel to and perpendicular to said rotational axis for attachment of the bearing assembly to the housing after accommodating said adjustable positioning of the bearing elements in radial and axial directions relative to said rotational axis.

12. In combination with a housing having a rotational axis along which an operational shaft axially extends, a bearing assembly supporting said shaft for rotation about said axis, including a plurality of bearing elements; bushing means in engagement with the bearing elements for support thereof in adjusted angularly spaced positions within the housing; and fastener means attaching the bushing means and the bearing elements to the housing for maintaining said adjusted positions of the bearing elements, said bushing means comprising an annular flange attached to the housing by said fastener means and a plurality of angularly spaced sectors extending axially from the flange between which the bearing elements are retained in said adjusted positions thereof.

13. In combination with a housing having a rotational axis along which an operational shaft axially extends, a bearing assembly supporting said shaft for rotation about said axis, including a plurality of bearing elements; bushing means in engagement with the bearing elements for support thereof in adjusted angularly spaced positions within the housing; and fastener means attaching the bushing means and the bearing elements to the housing for maintaining said adjusted positions of the bearing elements, said bushing means comprising an annular flange attached to the housing by said fastener means; a plurality of sectors extending axially from the flange between which the bearing elements are retained in said adjusted positions thereof; and spacers respectively disposed between each of the bearing elements and the sectors.

14. In combination with a housing having a rotational axis along which an operational shaft axially extends, a bearing assembly supporting said shaft for rotation about said axis, including: a plurality of angularly spaced bearing elements; bushing means for supporting the bearing elements in adjusted position within the housing; fastener means for attaching the bushing means and the bearing elements to the housing to maintain said adjusted positions of the bearing elements and wedge-shaped space respectively disposed between each of the bearing elements and the bushing means.

* * * * *